United States Patent
Zhang et al.

(10) Patent No.: US 10,063,997 B2
(45) Date of Patent: Aug. 28, 2018

(54) METHOD AND DEVICE FOR POSITIONING USER EQUIPMENT

(71) Applicant: Telefonaktiebolaget L M Ericsson (publ), Stockholm (SE)

(72) Inventors: Yang Zhang, Shanghai (CN); Åke Busin, Sollentuna (SE); Di Shu, Shanghai (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 16 days.

(21) Appl. No.: 14/907,094

(22) PCT Filed: Jul. 26, 2013

(86) PCT No.: PCT/CN2013/080187
§ 371 (c)(1),
(2) Date: Jan. 22, 2016

(87) PCT Pub. No.: WO2015/010322
PCT Pub. Date: Jan. 29, 2015

(65) Prior Publication Data
US 2016/0157053 A1 Jun. 2, 2016

(51) Int. Cl.
*H04W 24/00* (2009.01)
*H04W 4/02* (2018.01)
(Continued)

(52) U.S. Cl.
CPC ............... *H04W 4/02* (2013.01); *G01S 5/021* (2013.01); *G01S 5/0221* (2013.01); *G01S 5/14* (2013.01);
(Continued)

(58) Field of Classification Search
CPC ............... H04W 64/00; H04W 52/146; H04W 74/0833; H04W 56/0005; H04W 84/045;
(Continued)

(56) References Cited

U.S. PATENT DOCUMENTS

| 9,549,288 B2 * | 1/2017 | Werner et al. ........ H03J 1/0075 455/150.1 |
| 2002/0093940 A1 * | 7/2002 | Toskala ............. H04W 56/0075 370/350 |

(Continued)

FOREIGN PATENT DOCUMENTS

| CN | 102045839 A | 5/2011 | |
| CN | 102045840 A | 5/2011 | |
| WO | WO 2010093294 A1 * | 8/2010 | ............. G01S 5/021 |

OTHER PUBLICATIONS

Catt, "R4-092859: Discussion on Timing Advance Measurement for Positioning," 3rd Generation Partnership Project (3GPP), TSG-RAN Working Group 4 (Radio) meeting #52, Aug. 24-28, 2009, 5 pages, Shenzhen, China.
(Continued)

*Primary Examiner* — Joseph Arevalo
(74) *Attorney, Agent, or Firm* — Withrow & Terranova, PLLC

(57) ABSTRACT

Positioning user equipment served by a base station in a wireless communication system is disclosed. The method comprises obtaining a timing value used by the user equipment for timing adjustment of uplink signal transmission and a timing bias used for adjusting the timing value. The method also comprises adjusting the timing value based on the timing bias. The method further comprises determining the position of the user equipment based on the adjusted timing value, wherein the timing bias is associated with at least one difference between at least one timing value obtained from at least one previous user equipment served by the base station and at least one timing value obtained from the base station with respect to the at least one previous user equipment. By means of the method and device, the positioning of the user equipment can be accurately achieved and less overhead could be incurred.

14 Claims, 5 Drawing Sheets

(51) Int. Cl.
*H04W 64/00* (2009.01)
*G01S 5/02* (2010.01)
*G01S 5/14* (2006.01)
*H04W 56/00* (2009.01)

(52) U.S. Cl.
CPC ....... *H04W 56/0015* (2013.01); *H04W 64/00* (2013.01)

(58) Field of Classification Search
CPC ........... H04W 36/0061; H04W 52/286; H04W 52/325; H04W 52/36; H04W 52/40; H04W 52/48; H04W 52/50; H04W 24/10; H04W 36/18; H04W 52/225; H04W 52/54
USPC .... 455/522, 422, 434, 561, 452.1, 423, 445, 455/436, 456.1; 370/331
See application file for complete search history.

(56) References Cited

U.S. PATENT DOCUMENTS

| | | |
|---|---|---|
| 2010/0331012 A1 | 12/2010 | Zhang |
| 2012/0003995 A1 | 1/2012 | Ishii et al. |
| 2012/0108263 A1* | 5/2012 | Zhang ................... G01S 5/0221 455/456.1 |
| 2015/0189610 A1* | 7/2015 | Siomina .................. G01S 5/021 370/280 |
| 2015/0341853 A1* | 11/2015 | Cho .................. H04W 56/0015 370/331 |

OTHER PUBLICATIONS

International Search Report and Written Opinion for International Patent Application No. PCT/CN2013/080187, dated May 8, 2014, 12 pages.
International Preliminary Report on Patentability for International Patent Application No. PCT/CN2013/080187, dated Feb. 4, 2016, 6 pages.
Ericsson et al., "R4-093828: Overview of Requirements for Enhanced Cell ID Positioning Method," 3rd Generation Partnership Project (3GPP), TSG-RAN WG4 Meeting #52bis, Oct. 12-16, 2009, 4 pages, Miyazaki, Japan.
Extended European Search Report for European Patent Application No. 13890070.9, dated Apr. 7, 2017, 9 pages.
Author Unknown, "Technical Specification Group Radio Access Network; Evolved Universal Terrestrial Radio ccess (E-UTRA); LTE Positioning Protocol A (LPPa) (Release 11)," Technical Specification 36.455, Version 11.1.0, 3GPP Organizational Partners, Dec. 2012, 52 pages.

* cited by examiner

METHOD AND DEVICE FOR POSITIONING USER EQUIPMENT

This application is a 35 U.S.C. § 371 national phase filing of International Application No. PCT/CN2013/080187, filed Jul. 26, 2013, the disclosure of which is incorporated herein by reference in its entirety.

TECHNICAL FIELD

The present invention relates generally to a method and device for positioning a user equipment (UE) served by a base station in a wireless communication system where timing adjustment is employed for user equipment transmissions.

BACKGROUND

Wireless communication networks are generally capable of providing information on the whereabouts of their subscribers, e.g., to an emergency facility, a traffic surveillance centre or other service unit needing or even requiring such positioning information. In general, the wireless communication networks may sometimes be required to provide and certify the location or position of a subscriber in order to support emergency services and other location dependent or location based services. Various positioning functions are therefore typically employed in the wireless communication networks for locating or positioning UEs connected to base stations in cells of the wireless communication network.

These positioning functions may include simply identifying the cell currently serving a UE of interest, which can provide an accurate enough position when the UE is connected to a base station serving a relatively small cell, but not particularly accurate when connected to a base station serving a larger cell. A more accurate position may further be derived from a used timing advance when the serving cell is known or derived from signal strength measurements on signals from different base station sites, or derived from the used timing advance and signal strength measurements.

The concept of time alignment or timing advance is generally used in wireless communication networks employing time division multiplexing where UEs sharing the same transmit frequency are directed to transmit their signals during allocated timeslots, commonly referred to as TDMA (Time Division Multiplex Access). FIG. 1a illustrates schematically how timing advance is used in a cell covered by a base station BS. Three UEs A, B and C are currently connected to the serving base station BS, and different timeslots 100 are allocated to the UEs such that UEs A, B, and C are directed to transmit signals "A," "B" and "C" in successive timeslots 100, respectively, as indicated in FIG. 1a. The UEs A-C are thus synchronised with BS to allow for proper timing of the transmission and reception of signals.

In this example, UEs A and C are located relatively close to BS, while the UE B is located at a greater distance from BS. As a result, the signals from UEs A and C will arrive basically "in time" to BS while the signals from the UE B would arrive somewhat late due to propagation delays, thus not exactly fitting into the allocated timeslot when received at BS, which could cause interference due to overlap with signals from the UE C in this case. In order to avoid such interference, BS orders the UE B to transmit its signals somewhat earlier by a parameter called Timing Advance (TA). This mechanism is generally referred to as time alignment. Thus, by adjusting the timing of transmissions from the UE B in this way, the signals will arrive properly at BS in the allocated timeslot as indicated in FIG. 1a.

Although the parameter TA was originally conceived to adjust UE transmissions to fit into a timeslot scheme at the receiving base station, TA has been frequently utilised to provide location information as well. As the propagation speed of radio signals is known to equal the speed of light C, the TA used by a specific UE further implies the distance D between that UE and the serving base station as $D=\frac{1}{2}C \times TA$. According to $3^{rd}$ Generation Partnership Project (3GPP), TA is specified as an integer between 0 and 63 representing time steps in the interval 0 µs through 232 µs, each step thus representing approximately 3.7 µs which corresponds to 553 meters of signal propagation. The location of a UE can thus be estimated by knowing the location of the serving base station and the TA used. In many wireless systems, the base station's location is basically given by a parameter "Cell Global Identity" (CGI) providing the coordinates of the base station.

FIG. 1b illustrates that when a UE, not shown, is directed by a serving base station BS to use a specific timing advance value TA to adjust its transmissions, that TA value can further be used to calculate an expected UE distance from BS as being within a potential position area P at a distance of TA×553 meters from BS, according to 3GPP. If BS covers 360°, i.e., an omni cell, the UE is presumably located somewhere within a circle area or ring P(Omni), while if BS covers a sector less than 360°, i.e., a sector cell, the UE can be somewhere within a circle sector area P(Sector), as illustrated in FIG. 1b. For example, if TA=10, the UE is expected to be located at a distance of around 5.5 kilometers from the base station. Since TA is specified in 3GPP according to predefined integers, the expected UE/base station distance can be determined within an uncertainty interval of 553 meters.

Utilising the CGI/TA information for positioning is particularly attractive since it is promptly available at the serving base station or at a base station controller BSC, and no further measurements nor added functionality in UEs are necessary. The above positioning method is frequently used in Global System for Mobile Communications (GSM) and other similar mobile systems using timing adjustment. For instance, the concept of cell ID and timing information as discussed before can also be equally applied in other radio access technologies, e.g., Wideband Code Division Multiple Access (WCDMA) and Long Term Evolution (LTE), which have a very similar mechanism of "cell" and "timing compensation" as GSM.

Take an LTE system as an example, as illustrated in FIG. 2a, an Evolved Serving Mobile Location Centre (E-SMLC) is able to obtain timing information (UE reception-transmission) from the UE which is shown as a handset via an LTE Positioning Protocol (LPP) interface or from eNB (evolved Node B, a particular form of a base station) through a Mobility Management Entity (MME) via an LTE Positioning Protocol A (LPPa) interface. By using timing information in the enhanced cell identifier (ECID) method, the E-SMLC is capable of determining the position of the UE. However, the position determined in this manner gives rise to some problems in terms of accuracy and overhead.

It is known that the timing information (more specifically, the timing value) reported by the UE through the LPP interface is relatively unreliable since remarkable uncompensated additional delay as illustrated in FIG. 2b exists between the antenna and eNB baseband possibly due to the cabling, a deployed Radio Remote Unit (RRU), etc. This kind of delay may vary from site to site and could reach microsecond level or tens of microsecond level which corresponds to hundreds of meters or several kilometers in terms of the location error, which may be unacceptable and may render the positioning less than optimal or sometimes inaccurate.

In order to eliminate or shorten this delay and obtain a reasonably good accuracy for the positioning, the eNB would offset the timing value with the estimated delay prior to sending the timing value to the E-SMLC via the LPPa interface. Accordingly, the E-SMLC needs to interact with the eNB through the LPPa interface for reliable timing based positioning. However, the LPP positioning associated with the LPPa signaling might not be expected by the 3GPP standards.

That being the case, for each LPP ECID positioning session, the E-SMLC will be forced to trigger an LPPa session for timing measurement due to instability of the LPP timing measurement. This would inevitably result in the lengthened response time and additional network resources for signaling transmissions involving the MME and eNB as illustrated in FIG. 2a.

Further, a User Plane location server (e.g., SLP in FIG. 2b) which is also capable of positioning the UE, can only use the LPP over the User Location Protocol (ULP) to request the timing value from the UE rather than using the LPPa since the LPPa is only for the Control Plane. Due to absence of the LPPa interface, the accuracy achieved by the SLP in positioning would be degraded.

SUMMARY

It is an object of the invention to address at least one of the problems outlined above, and to provide a solution for increasing accuracy and reliability when determining the position of UEs. These objects and others may be obtained by providing a method and device for positioning a UE served by a base station in a wireless communication system.

According to one aspect of the present invention, there is provided a method for positioning a UE served by a base station in a wireless communication system. The method comprises obtaining a timing value used by the UE for timing adjustment of uplink signal transmission and a timing bias used for adjusting the timing value. The method also comprises adjusting the timing value based on the timing bias. The method further comprises determining the position of the UE based on the adjusted timing value. In the method, the timing bias is associated with at least one difference between at least one timing value obtained from at least one previous UE served by the base station and at least one timing value obtained from the base station with respect to the at least one previous UE.

In one embodiment, obtaining the timing value used by the UE comprises obtaining the timing value via an LPP interface.

In another embodiment, the timing value obtained from the base station is obtained via an LPPa interface.

In yet another embodiment, obtaining at least one timing value from the at least one previous UE and obtaining at least one timing value from the base station with respect to the at least one previous UE comprises obtaining a sequence of timing value pairs $\{TA1(i),TA2(i)\}$, i=1 ... N, wherein $TA1(i)$ and $TA2(i)$ respectively represent the timing value obtained from $i^{th}$ previous UE from the N number of previous UEs and the timing value from the BS serving the $i^{th}$ previous UE or respectively represent the $i^{th}$ timing value obtained from one previous UE and the $i^{th}$ timing value obtained from the BS serving the one previous UE.

In a further embodiment, the timing bias is obtained by performing a search for a minimum mean absolute error using the $\{TA1(i),TA2(i)\}$ pairs as input.

The method and its extensions as discussed in the embodiments above can be performed at a user plane location server or at an E-SMLC. Additionally, the timing value as discussed above includes a time alignment value or a timing value determined based on a round-trip time value.

According to another aspect of the present invention, there is provided a device for positioning a UE served by a base station in a wireless communication system. The device comprises an obtaining unit configured to obtain a timing value used by the UE for timing adjustment of uplink signal transmissions and a timing bias used for adjusting the timing value. The device also comprises an adjusting unit configured to adjust the timing value based on the timing bias. The device further comprises a determining unit configured to determine the position of the UE based on the adjusted timing value. In the device, the timing bias is associated with at least one difference between at least one timing value obtained by the obtaining unit from at least one previous UE served by the base station and at least one timing value obtained by the obtaining unit from the base station with respect to the at least one previous UE.

In an embodiment, the obtaining unit is configured to obtain the timing value used by the UE via an LPP interface.

In another embodiment, the obtaining unit is configured to obtain the timing value from the base station with respect to the at least one previous UE via an LPPa interface.

In yet another embodiment, the obtaining unit is configured to obtain a sequence of timing value pairs $\{TA1(i), TA2(i)\}$, i=1 ... N, wherein $TA1(i)$ and $TA2(i)$ respectively represent the timing value obtained from $i^{th}$ previous UE from the N number of previous UEs and the timing value from the BS serving the $i^{th}$ previous UE or respectively represent the $i^{th}$ timing value obtained from one previous UE and the $i^{th}$ timing value obtained from the base station serving the one previous UE.

In a further embodiment, the obtaining unit is configured to obtain the timing bias by performing a search for a minimum mean absolute error using the $\{TA1(i),TA2(i)\}$ pairs as input.

The device and its extensions as discussed in the embodiments above can be a user plane location server or an E-SMLC. Further, in the device and its extension as discussed above, the timing value includes a time alignment value or a timing value determined based on a round-trip time value.

With the method and device and their extensions as discussed in the embodiments above, by virtue of the timing bias, the accuracy of the timing value can be improved and therefore accurately positioning the UE can be realized in a more effective way. Further, since the timing bias can be flexibly applied to other UEs within the service coverage of the base station, less overhead would be caused due to less queries of the timing value to the base station.

BRIEF DESCRIPTION OF THE DRAWINGS

Exemplary embodiments of the invention will now be described in more detail and with reference to the accompanying drawings, in which.

DETAILED DESCRIPTION

While the making and using of various embodiments of the present invention are discussed in detail below, it should be appreciated that the present invention provides many applicable inventive aspects that can be embodied in a wide variety of specific contexts. The specific embodiments discussed herein are merely illustrative of specific ways to make and use the invention and do not delimit the scope of the invention.

To facilitate the understanding of embodiments of the present invention, a number of terms are defined below. Terms defined herein have meanings as commonly understood by a person of ordinary skill in the areas relevant to the present invention. Terms such as "a," "an" and "the" are not intended to refer to only a singular entity, but include the general class of which a specific example may be used for illustration. The terminology herein is used to describe specific embodiments of the invention, but their usage does not delimit the invention. For example, a BS in the present invention may refer to one of a NB, an eNB, a base transceiver station, a radio BS, and the like and thus they may be used interchangeably throughout the specification and claims as appropriate.

A mechanism and procedure are provided which can basically be used to obtain better accuracy and reliability when determining the position of UEs in a wireless communication network that employs timing adjustment. Briefly described, this solution can make the timing parameter more closely related to the true distance between a UE and its serving base station, thereby providing more accurate and reliable position determination based on the timing value currently used for a UE of interest.

An exemplary procedure for positioning a UE served by a base station in a wireless communication system, such as an LTE system, will now be described with reference to a flow chart of a method 30 shown in FIG. 3. The shown procedure may be executed by a positioning server, such as an E-SMLC or an SLP server or the like serving the wireless communication network.

Figure 3:
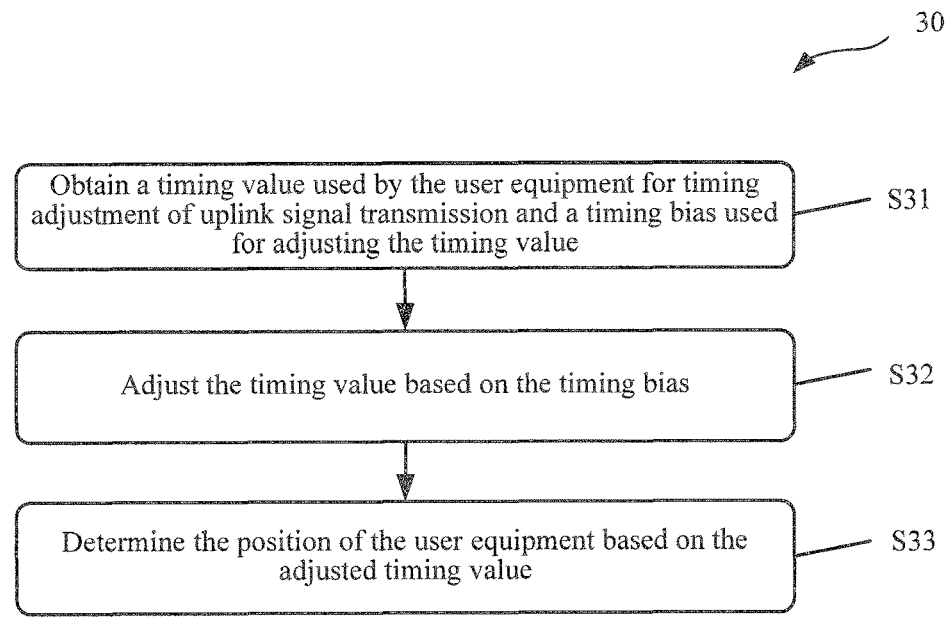
FIG. 3 shows a flow chart illustrating a method for positioning a UE served by a base station in a wireless communication system, according to another exemplary embodiment.

As illustrated in FIG. 3, at step S31, a timing value used by a UE for timing adjustment of uplink signal transmission and a timing bias used for adjusting the timing value are obtained. For example, the positioning server, when determining the location of the UE, may request the timing value from the UE and then, upon receipt of the request, the UE may send its current timing value to the positioning server. As noted before, this timing value received from the UE via e.g., an LPP interface not only indicates a distance between the UE and the serving base station but also implicitly includes an error which is common among a plurality of UEs within the coverage area of the serving base station and may be caused by the base station antenna cabling delay.

To cure the inaccuracy of the timing value used by the UE, the embodiments of the present invention introduce a timing bias which is intended to correct the timing value. The timing bias according to embodiments of the present invention may be associated with at least one difference between at least one timing value obtained from at least one previous UE served by the base station and at least one timing value obtained from the base station with respect to the at least one previous UE. Herein, at least one previous UE could be the UE that has been previously served by the base station and has sent its timing value(s) to the positioning sever one time or several times as required, regardless of whether it is still being served by the base station.

In addition to receipt of the timing value from the previous UE, the positioning server may also obtain the timing value from the base station with respect to the previous UE. As noted before, the timing value from the base station with respect to the previous UE could be transmitted via e.g., an LPPa interface and has a high accuracy in respect of indicating the distance between the base station antenna and the previous UE. This high accuracy may be attributable to the fact that it is easy for the base station itself to compensate internal delay caused by its radio components, e.g., the radio cabling and antenna.

Based on the different timing values collected from the at least one previous UE and the base station, the bias or difference between these timing values can be calculated and then used for adjusting the timing values used by other UEs, such as one set forth at step S31. There are several ways to determine the timing bias.

One way is that the timing bias is based on a timing value from one previous UE and a timing value from the base station. The timing bias is the difference between the two timing values. Another way is that the timing bias is determined based on multiple timing values separately reported by different previous UEs, and multiple timing values from the base station with respect to the previous UEs. That is, for each previous UE, there would be a timing value from this UE and a timing value from the base station with respect to the UE, thereby forming a sequence of timing value pairs. Then, multiple differences between the two types of timing value are obtained from the sequence of timing value pairs, and the timing bias is determined by a mathematic handling of these multiple differences, such as average calculation or Minimum Mean Absolute Error (MMAE) calculation.

Another way is that the timing bias is determined based on multiple timing values separately from a previous UE at different time and multiple timing values from a base station at the different time, forming a sequence of timing value pairs. Then multiple differences between the two types of timing value are obtained, and the timing bias is determined by a mathematic handling of these multiple differences.

For example, a sequence of timing value pairs {TA1(i), TA2(i)}, i=1 . . . N, is obtained, wherein TA1(i) and TA2(i) respectively represent the timing value obtained from $i^{th}$ previous UE from the N number of previous UEs and the timing value from the BS serving the $i^{th}$ previous UE or respectively represent the $i^{th}$ timing value obtained from one previous UE and the $i^{th}$ timing value obtained from the BS serving the one previous UE. On this basis, the timing bias is obtained by performing a search for an MMAE using the {TA1(i),TA2(i)} pairs as input, as will be discussed in detail with reference to FIG. 4.

Turning back to the method 30, at step S32, the timing value is adjusted based on the timing bias obtained in a manner as discussed above. The adjustment to the timing value may be carried out by mathematical operations, such as addition or subtraction, depending on the value of the timing bias being positive or negative. In this way, the error included in the timing value obtained from the UE could be eliminated. Then at step S33, the position of the UE is determined based on the adjusted timing value. For example, the positioning server would determine the location of the UE by the LPP ECID positioning method based on the accurate adjusted timing value.

By the aid of the method 30, the positioning of the UE can be accomplished in an effective manner with the adjusted timing value while providing a marked improvement in accuracy. Because the timing bias can be locally stored at the positioning server and could be kept valid for a period of time, there is no need for the base station to transmit the timing value via the LPPa interface frequently, thereby making it possible to reduce the signalling overhead. On the other hand, the LPP ECID positioning response time can be shortened due to less LPPa queries from the positioning server in view of the existing stored and valid timing bias. The timing bias may also be signalled to other network nodes (e.g., the SLP in FIG. 2*b*) for correcting the timing advance measurement through the LPP messages, thereby improving the timing and positioning accuracy of other network nodes without incurring excessive signalling overhead.

Figure 4:
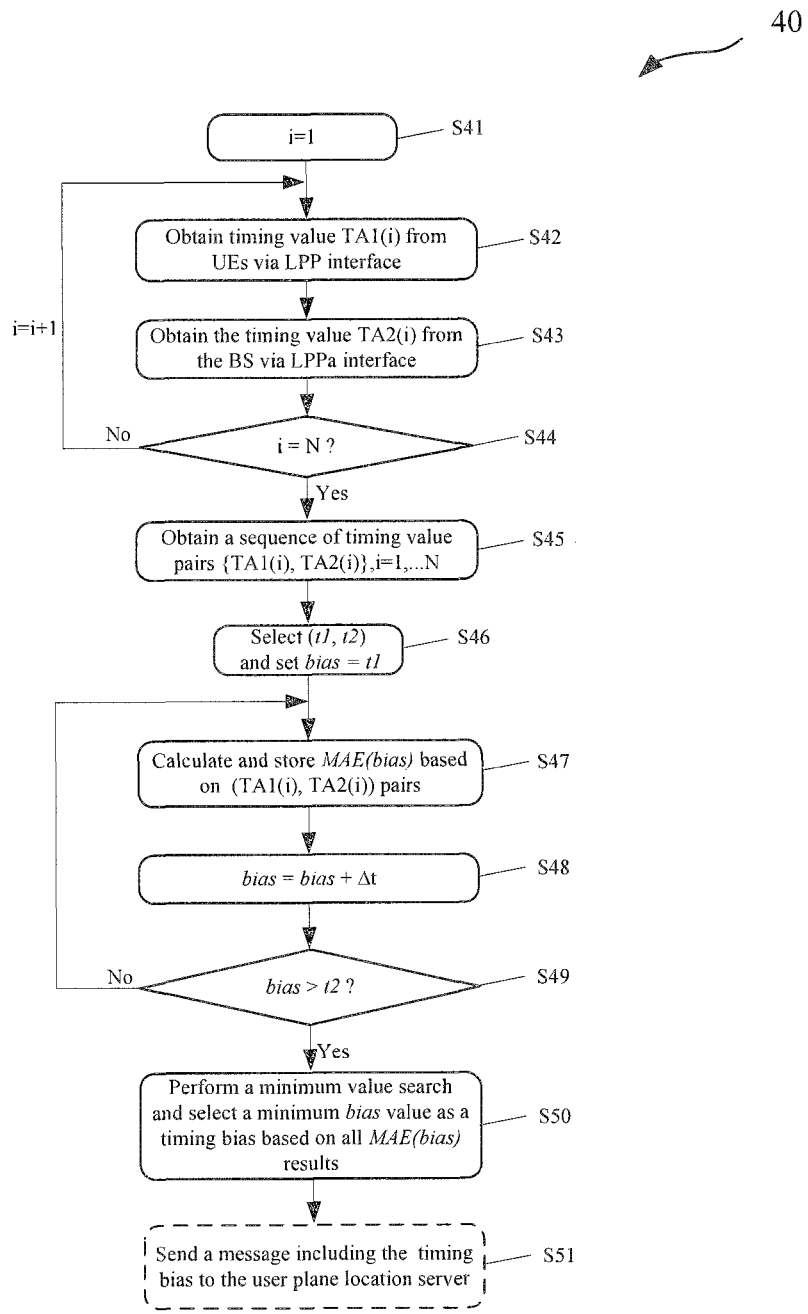
FIG. 4 shows a flow chart illustrating in detail how to determine the timing bias in the method as illustrated in FIG. 3, according to another exemplary embodiment.

FIG. 4 shows a flow chart 40 illustrating in detail how to determine the timing bias in the method 30 as illustrated in FIG. 3, according to another exemplary embodiment. As illustrated in FIG. 4, steps S41-S44 are intended to collect a sequent of timing value pairs {TA1(i),TA2(i)}, wherein {TA1(i),TA2(i)}, i=1 . . . N, wherein TA1(i) and TA2(i) respectively represent the timing value obtained from $i^{th}$ previous UE from the N number of previous UEs and the timing value from the BS serving the $i^{th}$ previous UE or respectively represent the $i^{th}$ timing value obtained from one previous UE and the $i^{th}$ timing value obtained from the BS serving the one previous UE, as mentioned before. For a simplifying purpose, it is herein assumed that TA1(i) and TA2(i) respectively represent the timing value obtained from $i^{th}$ previous UE from the N number of previous UEs and the timing value from the BS serving the $i^{th}$ previous UE.

Based on the assumption above, at step S41, the intermediate variable "i" is set to 1 at the outset. At step S42, the TA(1) is obtained from the UE 1 via the LPP interface. Then at step S43, the TA(2) with respect to the UE 1 is obtained from the base station via the LPPa interface. It is determined at step S44 whether the value of the intermediate variable "i" is equal to the value of the "N" which may be an integer greater than one. If this is not the case, the flow 40 loops back to step S42 after the value of the "i" is incremented by one. In this manner, the steps S42-S44 are repeated until the N number of the timing value pairs are collected, i.e., skipping the loop 40 until the value of the intermediate variable "i" is equal to N. As a result, at step S45, a sequence of timing value pairs {TA1(i),TA2(i)}, i=1 . . . N is obtained.

At step S46, a bias value range, e.g., [t1, t2] can be selected based on e.g., experience data or statistical records and the initial timing bias can be set to t1. Then, the timing bias is estimated by performing a search for an MMAE, using a sequence of available pairs {TA1(i),TA2(i)}, i=1 . . . N as input in Equation (1) below. The Mean Absolute Error (MAE) can thus be defined as:

$$MAE(\text{bias}) = \frac{1}{N}\sum_{i=1}^{N} \text{abs}(TA2(i) - TA1(i) - \text{bias}), \quad (1)$$

where abs represents an operator providing an absolute value, bias represents a timing bias variable for MMAE searching and initially is set to "t1".

At step S47, the MAE (t1) is calculated according to the Equation (1) using the candidate timing bias value t1 and the available {TA1(i),TA2(i)} pairs as input to Equation (1). At a next step S48, the timing bias is incremented by one step Δt to provide a new candidate timing bias value "t1+Δt." If at a following step S49 the timing bias has not exceeded the upper range limit t2, i.e., "No" at step S49, the calculation of step S47 is repeated for the new candidate timing bias=bias+Δt and the timing bias is further incremented at step S48, and so forth.

Eventually, when the timing bias has been incremented to exceed "t2," resulting in "Yes" at step S49, the MAE has been calculated for the entire range of "t1-t2." A search for MMAE among the calculated and stored values of MAE from step S47 is then performed at a further step S50. Additionally, filtering and interpolation operations can be applied to the curve shown in FIG. 5 to make it smoother and therefore a better bias estimate could be obtained. A timing bias value that corresponds to the MMAE is then selected as the final timing bias used for adjusting the timing value obtained from the UE, thereby providing a more accurate position for the UE. In some embodiments, the resulting timing bias can be arranged or managed in a location specific or cell specific way and delivery of the timing bias to other network nodes can be carried out in real time or in bulk manner.

Figure 1A:
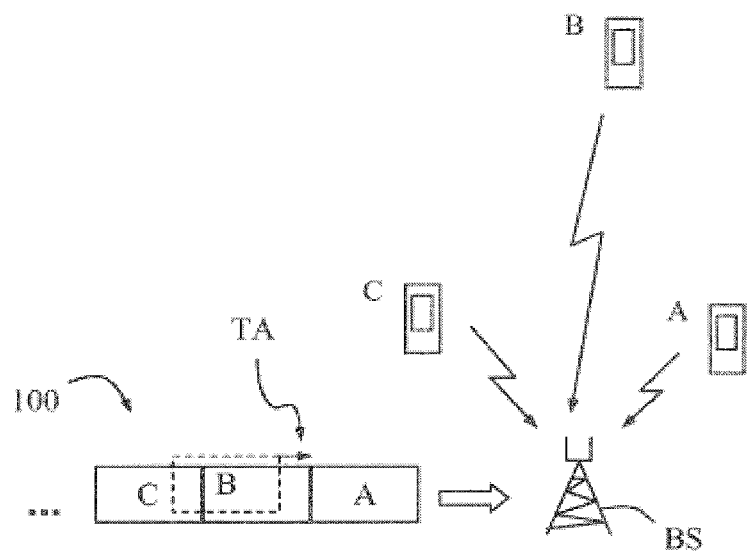
FIGS. 1a and 1b show schematic illustrations of how timing adjustment is used according to general practice.
Figure 1B:
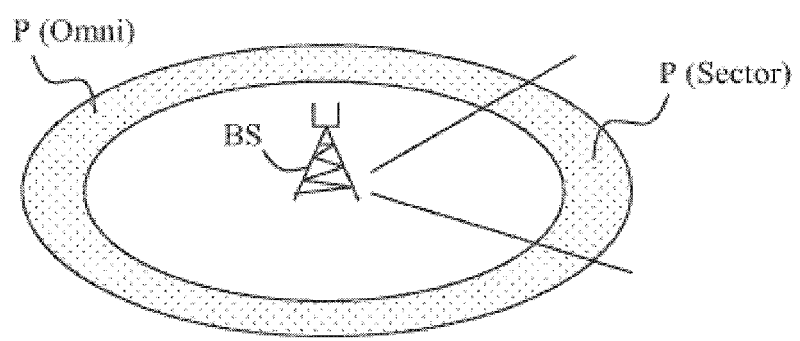
Figure 2A:
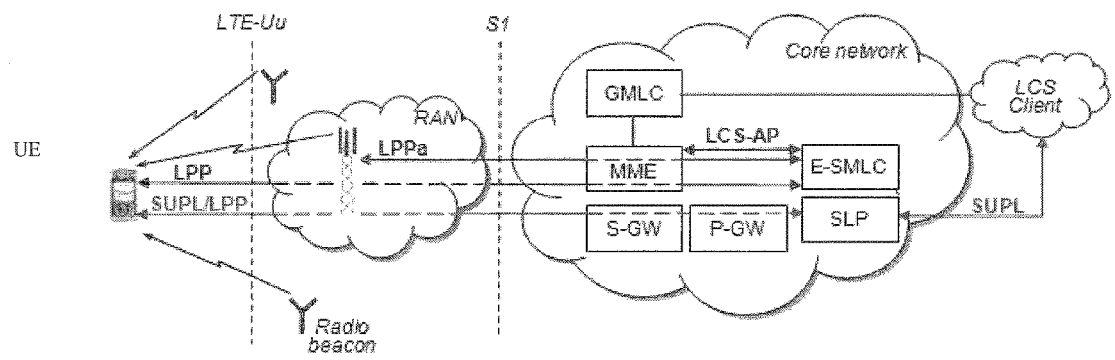
FIGS. 2a and 2b show schematic views illustrating the positioning of a UE in an LTE system, according to one exemplary embodiment.
Figure 2B:
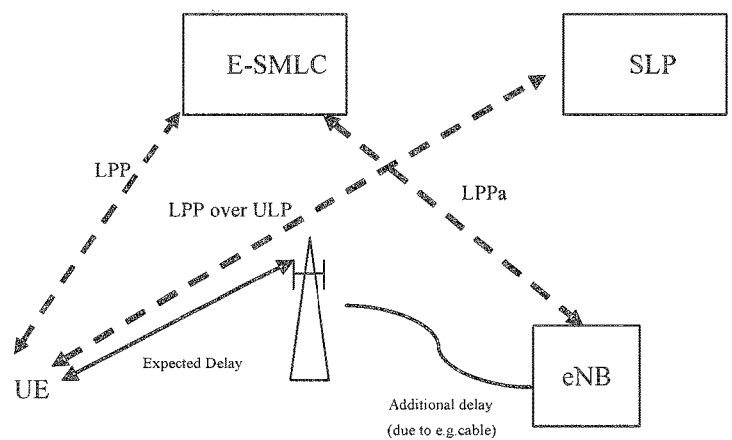

As an optional step S51, if the determination of the timing bias is performed at the E-SMLC, the resulting timing bias can be sent to a user plane location server, e.g., SLP as illustrated in FIG. 2*b*. This timing bias is useful for the user plane location server since the LPP is a part of the user plane protocols and it plays an important role in LTE positioning applications. The user plane location server is capable of using the timing bias to adjust the timing value of the UE and further determining the location of the UE, as discussed in connection with FIG. 2*b*. In addition, the timing bias is also useful for another UE because the UE based positioning may use such timing bias directly so as to achieve better accuracy for the positioning without real time intervention from the network side.

Figure 5:
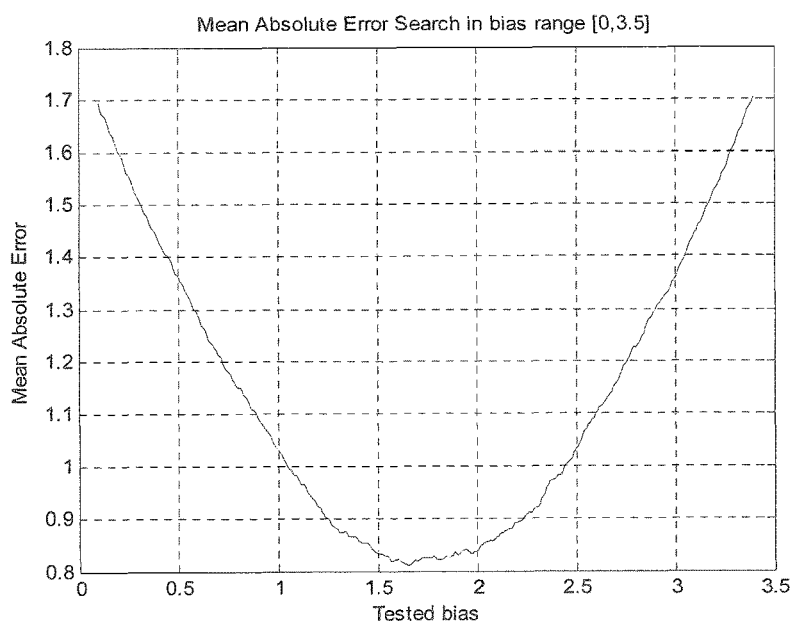
FIG. 5 shows a simulation diagram illustrating determination of a proper timing bias within a predetermined timing bias range, according to a further embodiment.

FIG. 5 show a simulation diagram illustrating determination of a proper timing bias within a predetermined timing bias range as discussed in connection with FIG. 4, according to a further embodiment. As shown in the horizontal axis in FIG. 5, the timing bias range at step S46 in the flow chart 40 is set to [0, 3.5], i.e., t1=0 and t2=3.5, in a unit of "us". Further shown in the vertical axis is the value range of the MAE from 0.8 to 1.8. By performance of the MMAE algorithm as discussed with reference to FIG. 4, at steps S47-S50, it can be seen from the simulation diagram that the MAE curve reaches the minimum when the timing bias is equal to 1.7 us. Thus, 1.7 us is the final value of the timing bias and can be used for adjusting the timing value obtained from the UE.

Figure 6:
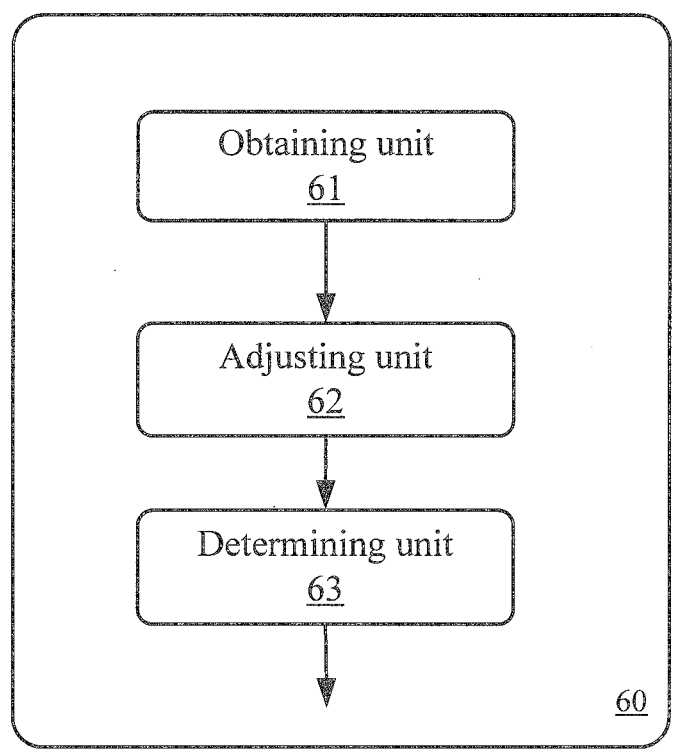
FIG. 6 shows a block diagram illustrating a device for positioning a UE served by a base station in a wireless communication system, according to yet another embodiment.

FIG. 6 shows a block diagram illustrating a device 60 for positioning a UE served by a base station in a wireless communication system, according to yet another embodiment. As illustrated in FIG. 6, the device 60 comprises an obtaining unit 61 configured to obtain a timing value used by the UE for timing adjustment of uplink signal transmissions and a timing bias used for adjusting the timing value. The device 60 also comprises an adjusting unit 62 configured to adjust the timing value based on the timing bias. The device 60 further comprises a determining unit 63 configured to determine the position of the user equipment based on the adjusted timing value. In the device 60, the timing bias is associated with at least one difference between at least one timing value obtained by the obtaining unit 61 from at least one previous UE served by the base station and at least one timing value obtained by the obtaining unit 61 from the base station with respect to the at least one previous UE.

In an embodiment, the obtaining unit 61 is configured to obtain the timing value used by the user equipment via an LPP interface.

In another embodiment, the obtaining unit 61 is configured to obtain the timing value from the base station with respect to the at least one previous UE via an LPPa interface.

In a further embodiment, the obtaining unit 61 is configured to obtain a sequence of timing value pairs {TA1(i), TA2(i)}, i=1 . . . N, wherein TA1(i) and TA2(i) respectively represent the timing value obtained from $i^{th}$ previous UE from the N number of previous UEs and the timing value from the BS serving the $i^{th}$ previous UE or respectively represent the $i^{th}$ timing value obtained from one previous UE and the $i^{th}$ timing value obtained from the base station serving the one previous UE.

In an additional embodiment, the obtaining unit 61 is configured to obtain the timing bias by performing a search for a minimum mean absolute error using the {TA1(i),TA2(i)} pairs as input.

In yet another embodiment, the device 60 is a user plane location server or an E-SMLC. When the device is a user plane location server, the obtaining unit 61 may obtain the timing bias from an E-SMLC.

The techniques described herein may be implemented by various means so that an device implementing one or more functions of a corresponding mobile entity described with an embodiment comprises not only prior art means, but also means for implementing the one or more functions of a corresponding device described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through units (e.g., procedures, functions, modules and so on) that perform the functions described herein.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for positioning a user equipment served by a base station in a wireless communication system, comprising:

obtaining a timing value used by the user equipment for timing adjustment of uplink signal transmission and a timing bias used for adjusting the timing value;
adjusting the timing value based on the timing bias; and
determining the position of the user equipment based on the adjusted timing value,
wherein the timing bias is associated with at least one difference between at least one timing value obtained from at least one previous user equipment served by the base station and at least one timing value obtained from the base station with respect to the at least one previous user equipment where the at least one difference is a result of an internal delay created by components of the base station.

2. The method according to claim 1, wherein obtaining the timing value used by the user equipment comprises obtaining the timing value via a long term evolution positioning protocol interface.

3. The method according to claim 1, wherein the timing value obtained from the base station is obtained via a long term evolution positioning protocol A interface.

4. The method according to claim 1, wherein obtaining at least one timing value from the at least one previous user equipment and obtaining at least one timing value from the base station with respect to the at least one previous user equipment comprises obtaining a sequence of timing value pairs {TA1(i),TA2(i)}, i=1 . . . N, wherein TA1(i) and TA2(i) respectively represent the timing value obtained from $i^{th}$ previous user equipment from the N number of previous user equipments and the timing value from the base station serving the $i^{th}$ previous user equipment or respectively represent the $i^{th}$ timing value obtained from one previous user equipment and the $i^{th}$ timing value obtained from the base station serving the one previous user equipment.

5. The method according to claim 4, wherein the timing bias is obtained by performing a search for a minimum mean absolute error using the {TA1(i),TA2(i)} pairs as input.

6. The method according to claim 1, wherein the method is performed at a user plane location server or at an evolved serving mobile location centre.

7. The method according to claim 1, wherein the timing value includes a time alignment value or a timing value determined based on a round-trip time value.

8. A device for positioning a user equipment served by a base station in a wireless communication system, comprising:

an obtaining unit configured to obtain a timing value used by the user equipment for timing adjustment of uplink signal transmissions and a timing bias used for adjusting the timing value;
an adjusting unit configured to adjust the timing value based on the timing bias; and
a determining unit configured to determine the position of the user equipment based on the adjusted timing value,
wherein the timing bias is associated with at least one difference between at least one timing value obtained by the obtaining unit from at least one previous user equipment served by the base station and at least one timing value obtained by the obtaining unit from the base station with respect to the at least one previous user equipment where the at least one difference is a result of an internal delay created by components of the base station.

9. The device according to claim 8, wherein the obtaining unit is configured to obtain the timing value used by the user equipment via a long term evolution positioning protocol interface.

10. The device according to claim 8, wherein the obtaining unit is configured to obtain the timing value from the base station with respect to the at least one previous user equipment via a long term evolution positioning protocol A interface.

11. The device according to claim 8, wherein the obtaining unit is configured to obtain a sequence of timing value pairs $\{TA1(i), TA2(i)\}$, $i=1 \ldots N$, wherein $TA1(i)$ and $TA2(i)$ respectively represent the timing value obtained from $i^{th}$ previous user equipment from the N number of previous user equipments and the timing value from the base station serving the $i^{th}$ previous user equipment or respectively represent the $i^{th}$ timing value obtained from one previous user equipment and the $i^{th}$ timing value obtained from the base station serving the one previous user equipment.

12. The device according to claim 11, wherein the obtaining unit is configured to obtain the timing bias by performing a search for a minimum mean absolute error using the $\{TA1(i), TA2(i)\}$ pairs as input.

13. The device according to claim 8, wherein the device is a user plane location server or an evolved serving mobile location centre.

14. The device according to claim 8, wherein the timing value includes a time alignment value or a timing value determined based on a round-trip time value.

\* \* \* \* \*